(12) United States Patent
Sauermann (10) Patent No.: US 11,933,991 B2
(45) Date of Patent: Mar. 19, 2024

(54) OPTICAL APPARATUS FOR IMPROVING CAMERA SENSITIVITY AND MATCHING OF IDENTICAL PERSPECTIVES

(71) Applicants: Sony Corporation, Tokyo (JP); Sony Pictures Entertainment Inc., Culver City, CA (US)

(72) Inventor: Felix Sauermann, Lawndale, CA (US)

(73) Assignees: SONY GROUP CORPORATION, Tokyo (JP); SONY PICTURES ENTERTAINMENT INC., Culver (JP)

( * ) Notice: Subject to any disclaimer, the term of this patent is extended or adjusted under 35 U.S.C. 154(b) by 0 days.

(21) Appl. No.: 17/036,910

(22) Filed: Sep. 29, 2020

(65) Prior Publication Data
US 2022/0099987 A1 Mar. 31, 2022

(51) Int. Cl.
*G02B 27/10* (2006.01)
*H04N 5/33* (2023.01)
*H04N 23/55* (2023.01)

(52) U.S. Cl.
CPC ........... *G02B 27/1013* (2013.01); *H04N 5/33* (2013.01); *H04N 23/55* (2023.01)

(58) Field of Classification Search
CPC ..... G02B 27/1013; H04N 5/2254; H04N 5/33
See application file for complete search history.

(56) References Cited

U.S. PATENT DOCUMENTS

| 5,600,487 | A | * | 2/1997 | Kiyomoto | G02B 6/4246 |
| | | | | | 359/586 |
| 6,215,597 | B1 | * | 4/2001 | Duncan | G02B 27/145 |
| | | | | | 359/637 |
| 7,375,803 | B1 | * | 5/2008 | Bamji | G02B 27/1013 |
| | | | | | 356/4.01 |
| 8,903,232 | B1 | | 12/2014 | Caldwell | |
| 9,531,961 | B2 | | 12/2016 | Rivard et al. | |

(Continued)

FOREIGN PATENT DOCUMENTS

CN 1311872 A 9/2001
CN 206602579 U 10/2017
(Continued)

OTHER PUBLICATIONS https://openaccess.thecvf.com/content_cvpr_2018_workshops/w21/html/Loveday_On_the_Impact_CVPR_2018_paper.html; published Jun. 16, 2018, 10 pages.

*Primary Examiner* — Sinh Tran
*Assistant Examiner* — Zhenzhen Wu
(74) *Attorney, Agent, or Firm* — Procopio, Cory, Hargreaves & Savitch LLP (57) ABSTRACT

Methods, systems, and computer-readable storage medium including: a lens and a focal reducer to receive a beam of image; a beam splitter to receive the beam of image from the focal reducer and split the beam of image into multiple directions. The system also includes a plurality of sensors coupled to the beam splitter. Each sensor of the plurality of sensors is configured to sense the beam of image within a particular band of frequencies. Further, the particular band of frequencies of a first sensor of the plurality of sensors does not overlap with the particular band of frequencies of a second sensor of the plurality of sensors. The focal reducer condenses and amplifies the beam of image to increase the sensitivity of each sensor.

16 Claims, 4 Drawing Sheets

(56) References Cited

U.S. PATENT DOCUMENTS

| | | | |
|---|---|---|---|
| 2002/0097388 A1* | 7/2002 | Raz | G02B 21/365 |
| | | | 356/39 |
| 2002/0131018 A1* | 9/2002 | Lucas | G03B 21/56 |
| | | | 352/85 |
| 2008/0158566 A1 | 7/2008 | Suzuki | |
| 2010/0302376 A1 | 12/2010 | Boulanger | |
| 2011/0079713 A1 | 4/2011 | Kim | |
| 2013/0064532 A1* | 3/2013 | Caldwell | G02B 9/34 |
| | | | 359/781 |
| 2014/0313344 A1 | 10/2014 | Tsao et al. | |
| 2015/0248050 A1* | 9/2015 | Nakamura | G02B 9/04 |
| | | | 359/675 |
| 2018/0041721 A1 | 2/2018 | Lewkow et al. | |
| 2018/0124382 A1 | 5/2018 | Smith | |
| 2018/0132706 A1* | 5/2018 | Nagae | G02B 21/18 |
| 2018/0176488 A1 | 6/2018 | Dvir | |
| 2018/0278857 A1* | 9/2018 | Ohishi | G02B 27/1013 |
| 2019/0098229 A1 | 3/2019 | Lovemelt | |
| 2019/0222777 A1* | 7/2019 | Lovemelt | H04N 5/2256 |
| 2019/0335161 A1 | 10/2019 | Courtès | |
| 2020/0202570 A1 | 6/2020 | Barbour | |
| 2021/0030263 A1* | 2/2021 | Kikuchi | G02B 13/146 |
| 2021/0337170 A1* | 10/2021 | Kiniwa | G02B 27/1013 |

FOREIGN PATENT DOCUMENTS

| | | | |
|---|---|---|---|
| CN | 107920726 A | | 4/2018 |
| CN | 111527744 A | | 8/2020 |
| RU | 2120196 C1 | | 10/1998 |
| WO | WO-2016013974 A1 | | 1/2016 |

* cited by examiner

OPTICAL APPARATUS FOR IMPROVING CAMERA SENSITIVITY AND MATCHING OF IDENTICAL PERSPECTIVES

BACKGROUND

Field

The present disclosure relates to optical apparatus, and more specifically, to image matching and the amplification of video signals in video production.

Background

In a conventional system for video production, a large setup may be necessary for large film formats (e.g., Image Maximum (IMAX) format of 65 mm or 70 mm). However, the large setup may be bulky and complex. Further, the matte generation using the large setup may involve difficult and complex processes.

SUMMARY

The present disclosure provides for implementing a technique for an optical system that improves the sensitivity of a camera to light and allows for matching of two identical perspectives.

In one implementation, a system is disclosed. The system includes: a lens and a focal reducer to receive a beam of image; and a beam splitter to receive the beam of image from the focal reducer and to split the beam of image into multiple directions. The system also includes a plurality of sensors coupled to the beam splitter. Each sensor of the plurality of sensors is configured to sense the beam of image within a particular band of frequencies. Further, the particular band of frequencies of a first sensor of the plurality of sensors does not overlap with the particular band of frequencies of a second sensor of the plurality of sensors. In one implementation, the focal reducer condenses and amplifies the beam of image to increase the sensitivity of each sensor.

In one implementation, the beam splitter includes at least a first splitter attachment to couple to the first sensor and a second splitter attachment to couple to the second sensor. In one implementation, the first sensor includes a first sensor attachment to couple to the first splitter attachment and the second sensor includes a second sensor attachment to couple to the second splitter attachment. In one implementation, the first sensor attachment couples directly to the first splitter attachment without an objective lens disposed in between. In one implementation, the second sensor attachment couples directly to the second splitter attachment without an objective lens disposed in between. In one implementation, the first sensor is a visible light sensor configured to produce a visible light-sensed image and the second sensor is an infra-red (IR) sensor configured to produce an IR sensed image. In one implementation, the system further includes a processor to receive and combine the visible light-sensed image and the IR sensed image for use in a matte generation process. In one implementation, the lens is a large-format lens including an IMAX-format lens. In one implementation, the plurality of sensors includes a plurality of full-frame sensors. In one implementation, the lens is a full frame lens including a 35 mm format lens. In one implementation, the plurality of sensors includes a plurality of ⅔-inch sensors.

In another implementation, a method is disclosed. The method includes: receiving a beam of image through a lens and a focal reducer; splitting the beam of image using a beam splitter into multiple directions toward a plurality of sensors; and coupling the plurality of sensors to the beam splitter, wherein each sensor of the plurality of sensors is configured to sense the beam of image within a particular band of frequencies.

In one implementation, the particular band of frequencies of a first sensor of the plurality of sensors does not overlap with the particular band of frequencies of a second sensor of the plurality of sensors. In one implementation, the method further includes receiving and processing the beam-split image to generate a first frequency-sensed image sensed through the particular band of frequencies of the first sensor; and receiving and processing the beam-split image to generate a second frequency-sensed image sensed through the particular band of frequencies of the second sensor. In one implementation, the method further includes combining the first frequency-sensed image and the second frequency-sensed image. In one implementation, the lens is a large-format lens. In one implementation, the large-format lens includes an IMAX format lens. In one implementation, the plurality of sensors includes a plurality of full-frame sensors. In one implementation, the plurality of full-frame sensors includes a plurality of 35 mm format image sensors.

In a further implementation, a non-transitory computer-readable storage medium storing a computer program to reduce an image circle of a large format lens to cover a full-frame sensor is disclosed. The computer program includes executable instructions that cause a computer to: receive a beam of image through the large format lens including a focal reducer; split the beam of image into multiple directions toward a plurality of full-frame sensors using a beam splitter; and couple the plurality of full-frame sensors to the beam splitter, wherein each full-frame sensor of the plurality of full-frame sensors is configured to sense the beam of image within a particular band of frequencies.

Other features and advantages should be apparent from the present description which illustrates, by way of example, aspects of the disclosure.

BRIEF DESCRIPTION OF THE DRAWINGS

The details of the present disclosure, both as to its structure and operation, may be gleaned in part by study of the appended drawings, in which like reference numerals refer to like parts, and in which.

DETAILED DESCRIPTION

As described above, a conventional system for video production may require a large setup. For example, in a setup where the beam (of light) coming in from the scene needs to be directed to multiple sensors (with each sensor having a separate lens), a large beam splitter may be necessary to process the large image circles for film formats such as IMAX, full frame, and 35 mm formats. However, the large setup may be bulky, complex, and prone to inaccuracies due to discrepancies in the two resulting images as a result of employing two individual lenses. Further, the matte generation using the large setup may involve difficult and complex processes.

Certain implementations of the present disclosure provide for apparatus and methods to reduces the image circle in video production. By shrinking the originally intended image circle and therefor condensing the image circle projected by the lens to cover a smaller area, incoming light is intensified. Depending on the size reduction of the image circle, a projected image may increase in brightness and intensity. That is, projecting more light onto a smaller area may permit more light to strike the image sensor of the camera, which may result in a better signal to noise ratio and thereby improve the cameras sensitivity to light. Further, the optical system may split the beam from one lens two ways to an IR sensitive sensor (hereinafter referred to as "IR sensor") and a red-green-blue (RGB) or visible light sensor (hereinafter referred to as "RGB sensor").

After reading the below descriptions, it will become apparent how to implement the disclosure in various implementations and applications. Although various implementations of the present disclosure will be described herein, it is understood that these implementations are presented by way of example only, and not limitation. As such, the detailed description of various implementations should not be construed to limit the scope or breadth of the present disclosure.

In one implementation, the optical system that reduces the image circle of a large format lens to cover the full frame sensor may include a lens and other optical elements similar to a focal reducer to intensify the beam by shrinking and condensing the image circle. The optical system may also split the beam from one lens and other optical elements two ways to the IR sensor and the RGB sensor. In another implementation, the optical system may split the beam from one lens multiple ways to a plurality of sensors, wherein each sensor is configured to filter the beam within a particular band of frequencies. The intensification of the beam may serve to compensate for any light lost by traveling a longer distance, traveling through additional elements, or being split multiple ways.

One objective of this optical system is to capture more light than would otherwise be possible with a ⅔-inch sensor or 35 mm full frame (or Super 35 mm) image lens circle. Another objective is to shrink a physically large beam splitter array that would otherwise be placed in front of two sensors (one IR and another RGB) and two lenses into a much smaller and lighter package. Therefore, in one implementation, the new setup of the optical system may need only one lens and an optional focal reducer (for amplifying the beam). Yet another objective is to reduce the complexity, weight and size in both the physical sensor rig as well as the image and software pipeline such as the matte generation process. The combined effect will be an IMAX-like look on a much smaller sensor/camera with the ability to separate a subject from its environment, without a green screen, while also allowing for dynamic or low light conditions.

Figure 1:
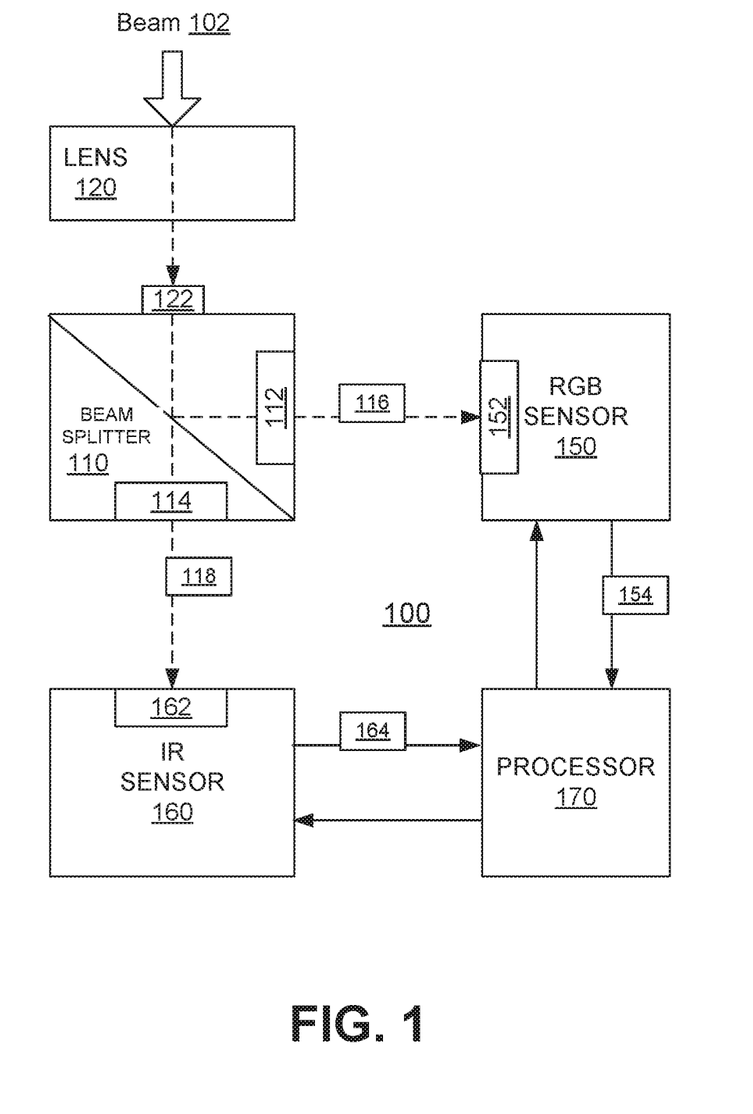
FIG. 1 is a block diagram of an optical system for reducing an image circle of a lens in accordance with one implementation of the present disclosure.

FIG. 1 is a block diagram of an optical system 100 for reducing an image circle of a lens in accordance with one implementation of the present disclosure. In the illustrated implementation of FIG. 1, the optical system 100 includes an objective lens 120, a beam splitter 110, an RGB sensor 150, an IR sensor 160, and a processor 170.

In the illustrated implementation of FIG. 1, the RGB sensor 150 includes an attachment 152 for attaching the beam splitter 110. Thus, in this implementation, the RGB sensor 150 does not include a lens but couples directly to the beam splitter 110. In the illustrated implementation of FIG. 1, the IR sensor 160 includes an attachment 162 for attaching the beam splitter 110. Thus, in this implementation, the IR sensor 160 does not include a lens but couples directly to the beam splitter 110. In the illustrated implementation of FIG. 1, the beam splitter 110 includes a first attachment 112 for attaching the beam splitter 110 to the attachment 152 of the RGB sensor 150, and a second attachment 114 for attaching the beam splitter 110 to the attachment 162 of the IR sensor 160. It should be noted that the attachments 112, 114, 152, 162 are replaceable elements in accordance with the size of the sensors 150, 160.

In the illustrated implementation of FIG. 1, the beam splitter 110 may attach to or include a focal reducer 122. In a first implementation, a beam (of visible light and IR) 102 is received through the objective lens 120 and the focal reducer 122 which reduces the image circle of a large format lens (e.g., 65 mm or IMAX format lens) to cover the full frame sensor (e.g., a 35 mm image sensor). Thus, the first implementation applies to the film market. In a second implementation, the focal reducer 122 reduces the image circle of a full frame sensor (e.g., a 35 mm image sensor) to cover the ⅔-inch sensor. Thus, the second implementation applies to the broadcast market, where the broadcast images provide a "film" look.

The beam splitter 110 then splits the beam 102 from the lens 120 and directs the beam 102 to the RGB sensor 150 and the IR sensor 160. The intensification of the beam 102 may serve to compensate for any light lost by traveling a longer distance, traveling through additional elements, or being split two ways.

By having a single lens 120 in front of the beam splitter 110 (i.e., the lens 120 is disposed before the beam splitter 110 in the path of the beam 102), while the lens in each of the sensors 150, 160 is removed or non-existent, images 116, 118 received at the sensors 150, 160 (through the attachments 112, 114, 152, 162) may be substantially identical. That is, not only do the images 116, 118 have the same field of view, but they may also be substantially identical because the images come from the same lens. Further, by including a focal reducer 122 between the lens 120 and the beam splitter 110, the size of the beam splitter 110 may be substantially reduced. Thus, the focal reducer 122 may be an optical element housed within, or as part of the beam splitter 110, or as a separate modular piece, that then attaches to and acts as a middle piece between the lens 120 and the beam splitter 110.

In the illustrated implementation of FIG. 1, the RGB sensor 150 receives the image 116 and produces a visible light-sensed image 154, while the IR sensor 160 receives the image 118 and produces an IR image 164. As described above, the images 116, 118 may be substantially identical.

In one implementation, the processor 170 receives the visible light-sensed image 154 and the IR image 164, and processes the images 154, 164 for various purposes. For example, when the optical system 100 is used for a matte generation process, the lens 120, the beam splitter 110, and the sensors 150, 160 may perform the initial processing of image or pixel matching based on the fact that the images 116, 118 are substantially identical. Since no two lenses are alike, a given lens will uniquely distort and modify the beam of light as it passes through it. The characteristics of the resulting image are therefore unique to that lens. To create an identical perspective from the point of view of two or more camera sensors, the beam of light needs to pass through one and the same lens before being split into two or more directions. Otherwise, matching the perspectives with beams originating from two different lenses may not be identical. Thus, the processor 170 may receive and process the images 154, 164 only for the control portion of the matte generation process in conjunction with artificial intelligence (AI) or machine learning to remove possible artifacts on the fly. Accordingly, the combined effect may be an IMAX-like look on a substantially smaller camera/sensor with the ability to separate a subject from its environment, without a green screen, while also allowing for dynamic or low light conditions.

In a general implementation, the system includes: a lens and a focal reducer to receive a beam of image; a beam splitter to receive the beam of image from the focal reducer of the lens and split the beam of image into multiple directions; and a plurality of sensors coupled to the beam splitter, wherein each sensor of the plurality of sensors is configured to sense the beam of image within a particular band of frequencies, and wherein the particular band of frequencies of a first sensor of the plurality of sensors does not overlap with the particular band of frequencies of a second sensor of the plurality of sensors.

In one implementation, the beam splitter includes at least a first splitter attachment to couple to the first sensor and a second splitter attachment to couple to the second sensor. The first sensor may include a first sensor attachment to couple to the first splitter attachment, and the second sensor may include a second sensor attachment to couple to the second splitter attachment. The first sensor attachment may couple directly to the first splitter attachment without a lens disposed in between. The second sensor attachment may couple directly to the second splitter attachment without a lens disposed in between. The lens may be a large-format lens including an IMAX format lens. The plurality of sensors includes a plurality of full-frame sensors including a plurality of 35 mm image sensors.

Figure 2:
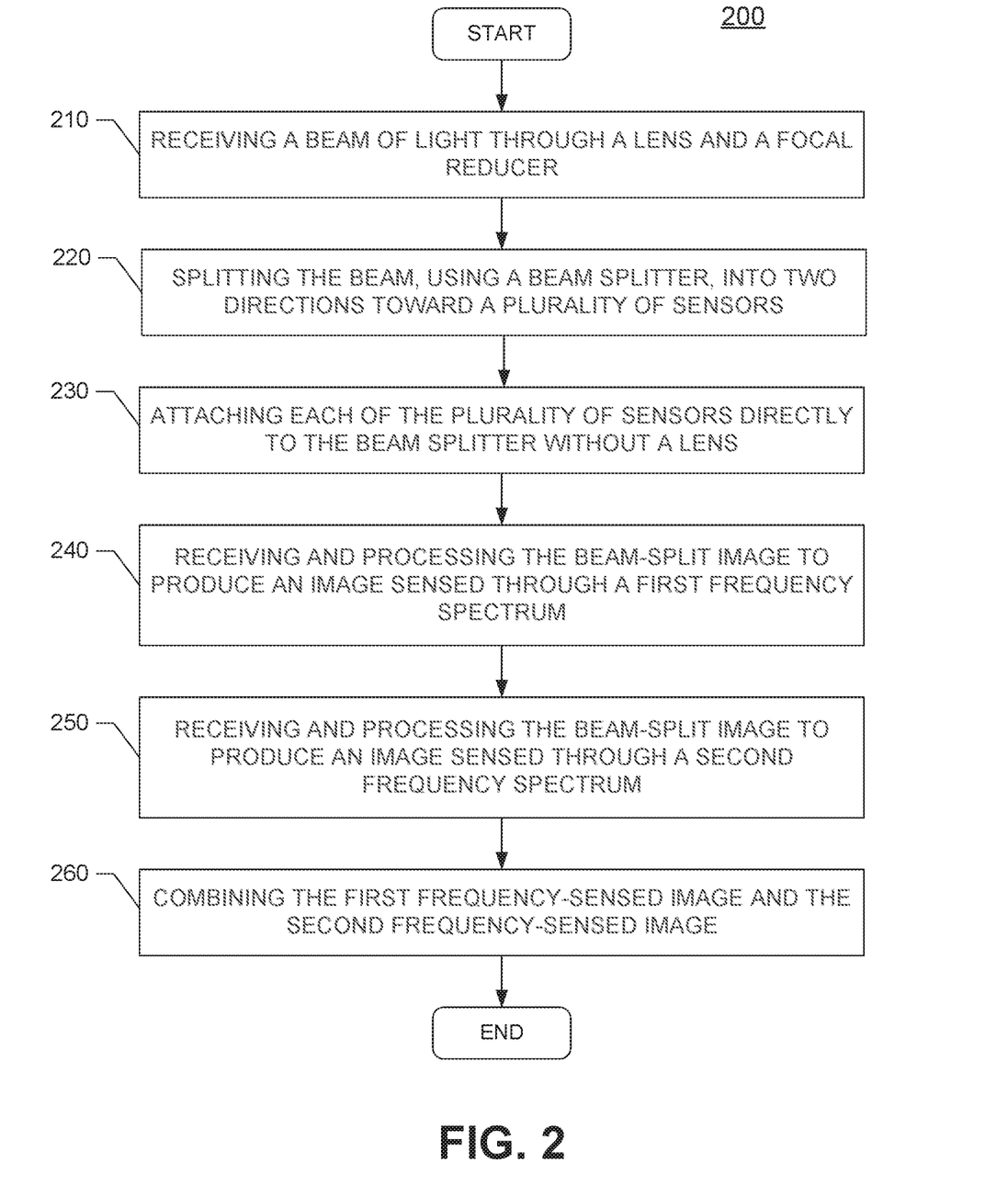
FIG. 2 is a flow diagram of a method for reducing an image circle of a lens in accordance with one implementation of the present disclosure.

FIG. 2 is a flow diagram of a method 200 for reducing an image circle of a lens in accordance with one implementation of the present disclosure. In the illustrated implementation of FIG. 2, the method 200 implements a technique for an optical system that improves the sensitivity of a camera to light and allows for matching of two identical perspectives.

In one implementation, a beam of light is received through a lens and a focal reducer, at step 210. The beam may then be split by a beam splitter into two directions, at step 220, toward a plurality of sensors. The plurality of sensors may include at least an RGB sensor and an IR sensor. The intensification of the beam made by the focal reducer may serve to compensate for any light lost by traveling a longer distance, traveling through additional elements, or being split two ways.

In one implementation, each of the plurality of sensors couples or attaches directly to the beam splitter without a lens, at step 230. Thus, by having a single lens in front of the beam splitter, while the lens in each of the plurality of sensors is removed or non-existent, images received at the sensors may be substantially identical. Further, by having a focal reducer in front of the beam splitter, the size of the beam splitter may be substantially reduced.

A first sensor of the plurality of sensors may receive and process the beam-split image to produce an image sensed or filtered through a first frequency spectrum (a first frequency-sensed image), at step 240. A second sensor of the plurality of sensors may receive and process the beam-split image to produce an image sensed or filtered through a second frequency spectrum (a second frequency-sensed image), at step 250. The first frequency-sensed image and the second frequency-sensed image may then be combined, at step 260, to enable the reduction of an image circle of a large format lens to cover a full frame sensor.

Figure 3A:
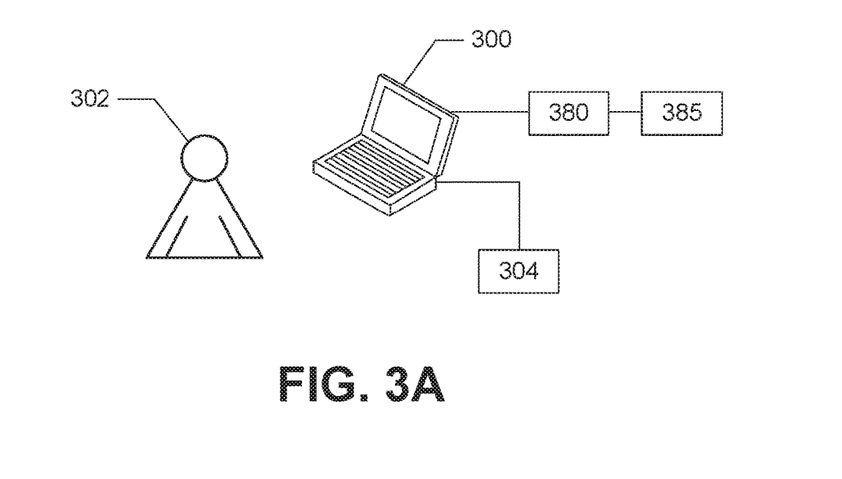
FIG. 3A is a representation of a computer system and a user in accordance with an implementation of the present disclosure.

FIG. 3A is a representation of a computer system 300 and a user 302 in accordance with an implementation of the present disclosure. The user 302 uses the computer system 300 to implement an image circle reduction application 390 for reducing an image circle of a large format lens to cover a full frame sensor as illustrated and described with respect to the processor 170 in FIG. 1 and the method 200 in FIG. 2.

Figure 3B:
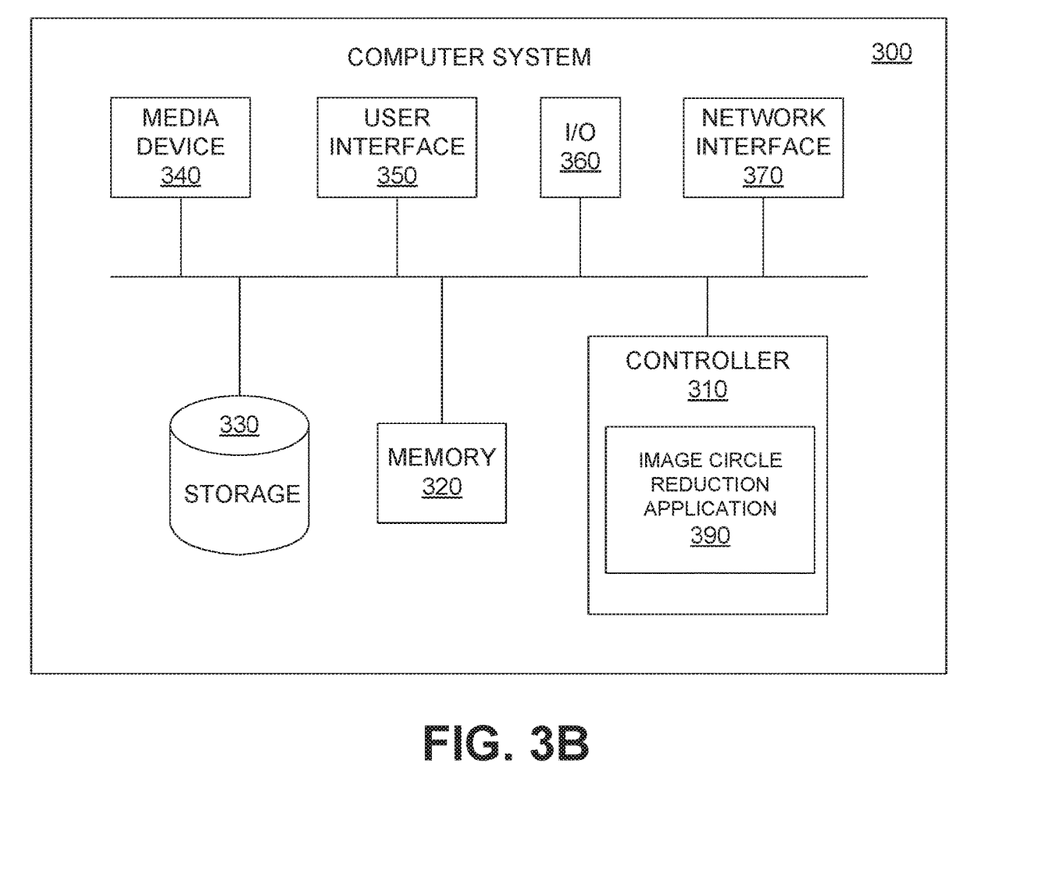
FIG. 3B is a functional block diagram illustrating the computer system hosting the image circle reduction application in accordance with an implementation of the present disclosure.

The computer system 300 stores and executes the image circle reduction application 390 of FIG. 3B. In addition, the computer system 300 may be in communication with a software program 304. Software program 304 may include the software code for the image circle reduction application 390. Software program 304 may be loaded on an external medium such as a CD, DVD, or a storage drive, as will be explained further below.

Furthermore, the computer system 300 may be connected to a network 380. The network 380 can be connected in various different architectures, for example, client-server architecture, a Peer-to-Peer network architecture, or other type of architectures. For example, network 380 can be in communication with a server 385 that coordinates engines and data used within the image circle reduction application 390. Also, the network can be different types of networks. For example, the network 380 can be the Internet, a Local Area Network or any variations of Local Area Network, a Wide Area Network, a Metropolitan Area Network, an Intranet or Extranet, or a wireless network.

FIG. 3B is a functional block diagram illustrating the computer system 300 hosting the image circle reduction application 390 in accordance with an implementation of the present disclosure. A controller 310 is a programmable processor and controls the operation of the computer system 300 and its components. The controller 310 loads instructions (e.g., in the form of a computer program) from the memory 320 or an embedded controller memory (not shown) and executes these instructions to control the system, such as to provide the data processing. In its execution, the controller 310 provides the image circle reduction application 390 with a software system, such as to perform the matte generation process to extract the subject from the environment without the need for a green screen. Alternatively, this service can be implemented as separate hardware components in the controller 310 or the computer system 300.

Memory 320 stores data temporarily for use by the other components of the computer system 300. In one implementation, memory 320 is implemented as RAM. In one implementation, memory 320 also includes long-term or permanent memory, such as flash memory and/or ROM.

Storage 330 stores data either temporarily or for long periods of time for use by the other components of the computer system 300. For example, storage 330 stores data used by the image circle reduction application 390. In one implementation, storage 330 is a hard disk drive.

The media device 340 receives removable media and reads and/or writes data to the inserted media. In one implementation, for example, the media device 340 is an optical disc drive.

The user interface 350 includes components for accepting user input from the user of the computer system 300 and presenting information to the user 302. In one implementation, the user interface 350 includes a keyboard, a mouse, audio speakers, and a display. The controller 310 uses input from the user 302 to adjust the operation of the computer system 300.

The I/O interface 360 includes one or more I/O ports to connect to corresponding I/O devices, such as external storage or supplemental devices (e.g., a printer or a PDA). In one implementation, the ports of the I/O interface 360 include ports such as: USB ports, PCMCIA ports, serial ports, and/or parallel ports. In another implementation, the I/O interface 360 includes a wireless interface for communication with external devices wirelessly.

The network interface 370 includes a wired and/or wireless network connection, such as an RJ-45 or "Wi-Fi" interface (including, but not limited to 802.11) supporting an Ethernet connection.

The computer system 300 includes additional hardware and software typical of computer systems (e.g., power, cooling, operating system), though these components are not specifically shown in FIG. 3B for simplicity. In other implementations, different configurations of the computer system can be used (e.g., different bus or storage configurations or a multi-processor configuration).

The description herein of the disclosed implementations is provided to enable any person skilled in the art to make or use the present disclosure. Numerous modifications to these implementations would be readily apparent to those skilled in the art, and the principals defined herein can be applied to other implementations without departing from the spirit or scope of the present disclosure. Although the above description includes systems and methods for improving the signal strength of a video signal and allowing for matching of two identical perspectives in video production including the film production and the broadcast, the described systems and methods are applicable in other field such as in medical imaging.

Figure 4:
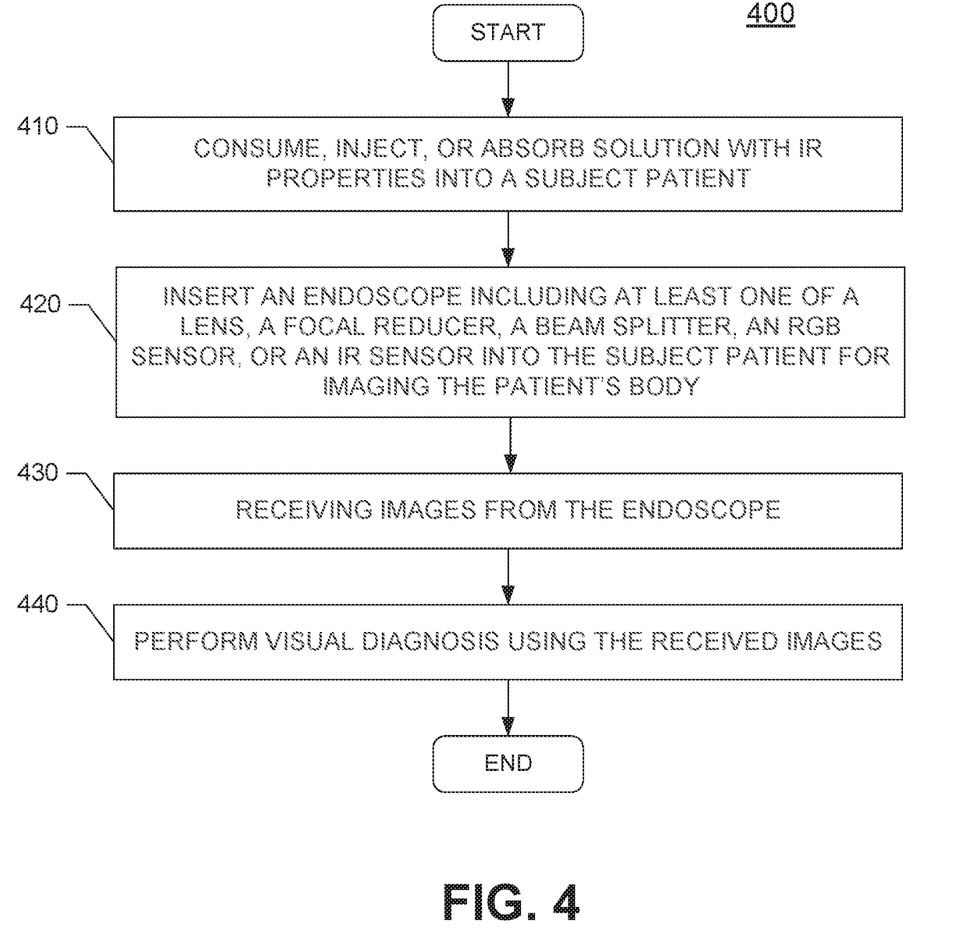
FIG. 4 is a method for a medical imaging in accordance with one implementation of the present disclosure.

For example, FIG. 4 is a method 400 for a medical imaging in accordance with one implementation of the present disclosure. In FIG. 4, a solution (e.g., liquid) with IR properties may be consumed, injected, or absorbed into the tract, tissue, or bloodstream of a subject patient, at step 410. The light intensifying properties may also be beneficial in this implementation. Subsequently, an endoscope, including at least one element (e.g, a lens, a focal reducer, a beam splitter, an RGB sensor, or an IR sensor) of FIG. 1 (e.g., in a miniaturized scale), may be inserted into a subject patient for imaging different parts of the patient's body, at step 420, and images from the endoscope is received, at step 430. The resulting images may then be used to for a visual diagnosis, at step 440. For example, the spread or localization of a tumor. In some implementations, a lens attached to one end of a fiber optic cable may transmit the image to the optical system described in FIG. 1, for example.

All features of each of the above-discussed examples are not necessarily required in a particular implementation of the present disclosure. Further, it is to be understood that the description and drawings presented herein are representative of the subject matter which is broadly contemplated by the present disclosure. It is further understood that the scope of the present disclosure fully encompasses other implementations that may become obvious to those skilled in the art and that the scope of the present disclosure is accordingly limited by nothing other than the appended claims.

The invention claimed is:

1. A system for movie production comprising:
   a lens to receive a beam of image having an image circle, wherein the lens is a large IMAX format lens;
   a focal reducer coupled to but separate from the lens, wherein the focal reducer reduces the image circle and intensifies the beam of image for use in the movie production;
   a beam splitter to receive the beam of image from the focal reducer and split the beam of image into multiple directions,
   wherein the beam splitter splits the beam of image into multiple beams having identical field of view;
   a plurality of sensors coupled to the beam splitter,
   wherein each sensor of the plurality of sensors is configured to sense the beam of image within a particular band of frequencies,
   wherein the particular band of frequencies of a first sensor of the plurality of sensors does not overlap with the particular band of frequencies of a second sensor of the plurality of sensors, and
   wherein the focal reducer reduces the image circle of the large IMAX format lens to cover a full frame sensor.

2. The system of claim 1, wherein the beam splitter comprises at least a first splitter attachment to couple to the first sensor and a second splitter attachment to couple to the second sensor.

3. The system of claim 2, wherein the first sensor includes a first sensor attachment to couple to the first splitter attachment and the second sensor includes a second sensor attachment to couple to the second splitter attachment.

4. The system of claim 3, wherein the first sensor attachment couples directly to the first splitter attachment without an objective lens disposed in between.

5. The system of claim 3, wherein the second sensor attachment couples directly to the second splitter attachment without an objective lens disposed in between.

6. The system of claim 1, wherein the first sensor is a visible light sensor configured to produce a visible light-sensed image and the second sensor is an infra-red (IR) sensor configured to produce an IR sensed image.

7. The system of claim 6, further comprising:
   a processor to receive and combine the visible light-sensed image and the IR sensed image for use in a matte generation process.

8. The system of claim 1, wherein the plurality of sensors includes a plurality of full-frame sensors.

9. The system of claim 1, wherein the plurality of sensors includes a plurality of ⅔-inch sensors.

10. A method for movie production, the method comprising:
    receiving a beam of image through a lens, wherein the beam of image has an image circle, and wherein the lens is a large IMAX format lens;
    reducing the image circle and intensifying the beam of image for use in the movie production, wherein reducing and intensifying is performed using a focal reducer coupled to but separate from the lens,
    wherein the focal reducer reduces the image circle of the large IMAX format lens to cover a full frame sensor;
    splitting the beam of image using a beam splitter into multiple directions toward a plurality of sensors,
    wherein the beam of image split into multiple beams having identical field of view;

coupling the plurality of sensors to the beam splitter,
wherein each sensor of the plurality of sensors is configured to sense the beam of image within a particular band of frequencies.

11. The method of claim 10, wherein the particular band of frequencies of a first sensor of the plurality of sensors does not overlap with the particular band of frequencies of a second sensor of the plurality of sensors.

12. The method of claim 11, further comprising:
receiving and processing the beam-split image to generate a first frequency-sensed image sensed through the particular band of frequencies of the first sensor; and
receiving and processing the beam-split image to generate a second frequency-sensed image sensed through the particular band of frequencies of the second sensor.

13. The method of claim 12, further comprising:
combining the first frequency-sensed image and the second frequency-sensed image.

14. The method of claim 10, wherein the plurality of sensors includes a plurality of full-frame sensors.

15. The method of claim 10, wherein the plurality of sensors includes a plurality of ⅔-inch sensors.

16. A non-transitory computer-readable storage medium storing a computer program to reduce an image circle of a lens in movie production, the computer program comprising executable instructions that cause a computer to:
receive a beam of image through a lens, wherein the beam of image has an image circle, and wherein the lens is a large IMAX format lens;
reduce the image circle and intensify the beam of image of the large IMAX format lens to cove a full frame sensor for use in the movie production;
split the beam of image into multiple directions toward a plurality of sensors using a beam splitter,
wherein the beam of image split into multiple beams having identical field of view;
couple the plurality of sensors to the beam splitter, wherein each sensor of the plurality of sensors is configured to sense the beam of image within a particular band of frequencies.

* * * * *